(12) United States Patent
Schultz

(10) Patent No.: US 9,075,798 B2  
(45) Date of Patent: Jul. 7, 2015

(54) VERIFYING AUTHENTICITY OF INPUT USING A HASHING ALGORITHM

(75) Inventor: Roderick David Schultz, San Francisco, CA (US)

(73) Assignee: Adobe Systems Incorporated, San Jose, CA (US)

( * ) Notice: Subject to any disclaimer, the term of this patent is extended or adjusted under 35 U.S.C. 154(b) by 163 days.

(21) Appl. No.: 12/847,649

(22) Filed: Jul. 30, 2010

(65) Prior Publication Data

US 2013/0166514 A1 Jun. 27, 2013

(51) Int. Cl.
*G06F 17/00* (2006.01)
*G06F 17/30* (2006.01)

(52) U.S. Cl.
CPC .......... *G06F 17/30* (2013.01); *G06F 17/30097* (2013.01)

(58) Field of Classification Search
USPC ......................................... 707/609, 705, 698
See application file for complete search history.

(56) References Cited

U.S. PATENT DOCUMENTS

| | | | |
|---|---|---|---|
| 5,475,826 A * | 12/1995 | Fischer | 707/695 |
| 5,893,086 A * | 4/1999 | Schmuck et al. | 1/1 |
| 7,505,605 B2 | 3/2009 | Rhoads et al. | |
| 7,640,181 B2 | 12/2009 | McClure et al. | |
| 7,698,559 B1 | 4/2010 | Chaudhury et al. | |
| 7,702,107 B1 | 4/2010 | Messing | |
| 7,735,144 B2 | 6/2010 | Pravetz et al. | |
| 7,844,835 B2 | 11/2010 | Ginter et al. | |
| 7,890,549 B2 * | 2/2011 | Elad et al. | 707/803 |
| 7,913,314 B2 | 3/2011 | Orthlieb et al. | |
| 7,917,749 B2 | 3/2011 | Ginter et al. | |
| 8,386,509 B1 * | 2/2013 | Scofield et al. | 707/769 |
| 2004/0153452 A1 * | 8/2004 | Carro | 707/9 |
| 2005/0172123 A1 * | 8/2005 | Carpentier et al. | 713/165 |
| 2008/0208828 A1 * | 8/2008 | Boiman et al. | 707/4 |

* cited by examiner

*Primary Examiner* — Hosain Alam
*Assistant Examiner* — Eliyah S Harper
(74) *Attorney, Agent, or Firm* — Wolfe-SBMC (57) ABSTRACT

Methods, systems, and apparatus, including computer programs encoded on a computer storage medium, for verifying a message based on application of a hashing algorithm. In one aspect, a method includes identifying a file and a key value and processing the file using multiple nonlinear functions to generate an output hash value, where the operations performed by the nonlinear functions are modified based on the key value. The file can then be verified based on the output hash value.

20 Claims, 4 Drawing Sheets

VERIFYING AUTHENTICITY OF INPUT USING A HASHING ALGORITHM

BACKGROUND

This specification relates to verifying the authenticity of an input message based on a hashing algorithm.

Hashing algorithms can be used to create a "fingerprint" of a file or other data input. Hash functions can be used to create a hash value that can serve as an identifier of a file or other data. The hash value can be used as a shortcut for a lookup table or can be used for data comparison, e.g., to detect duplicate data or to verify that a particular file is an authentic copy of another file. In some cases, hash functions for different files can map to the same hash value, which results in a collision. Typically, it is desirable to minimize such collisions, so hash functions that have relatively high collision-resistance are generally preferable over less collision-resistant hash functions. It is typically also desirable that a hash function is resistant to creation of alternative messages that produce the same hash value. Examples of hashing algorithms include MD4 (message digest algorithm 4), MD5, SHA-1, and RIPEMD.

SUMMARY

This specification describes technologies relating to hashing algorithms in which the operations performed during execution of the hashing algorithm are modified based on an input key.

In general, one innovative aspect of the subject matter described in this specification can be embodied in methods that include the actions of identifying a file, identifying a key value, and processing the file using a plurality of nonlinear functions to generate an output hash value. The operations performed by the plurality of nonlinear functions are modified based on the key value, and the file can be verified based on the output hash value. Other embodiments of this aspect include corresponding systems, apparatus, and computer programs, configured to perform the actions of the methods, encoded on computer storage devices.

These and other embodiments can each optionally include one or more of the following features. Processing the file using the plurality of nonlinear functions can include identifying an input hash value and modifying the input hash value by iteratively applying at least a subset of the plurality of nonlinear functions to data from the file. Processing the file using the plurality of nonlinear functions can also further include segmenting the file into a plurality of blocks and modifying the input hash value by iteratively applying at least a subset of the plurality of nonlinear functions to each of the plurality of blocks. Processing the file using the plurality of nonlinear functions can further include modifying the input hash value by iteratively applying a plurality of subsets of nonlinear functions to data from the file in parallel to generate a plurality of parallel hash values, and combining the parallel hash values to generate the output hash value. The operations performed by the plurality of nonlinear functions are modified based on the key value by determining an amount of rotation to be applied to data from the file based on the key value and/or selecting specific data for processing by the plurality of nonlinear functions based on the key value. The operations performed by the plurality of nonlinear functions include rotating data in the blocks and at least one of calculating a complement of data in the blocks or performing Boolean operations on data in the blocks. Generating the output hash value further includes processing the key value using one or more of the plurality of nonlinear functions. The file is a files that is used to present multimedia content on a client device. The file includes a SWF file. The file is received from a server, either the key value or an identification of the key value is received from the server, and the multimedia content is presented using the file in response to verifying the file. Verifying the file includes sending the output hash value to the server for verification. Verifying the file includes comparing the output hash value to an output hash value associated with the file and/or the multimedia content.

In general, another aspect of the subject matter described in this specification can be embodied in methods that include the actions of receiving a file to be verified, identifying a key value for use in verifying the file, segmenting the file into a plurality of blocks, modifying each of a plurality of predetermined nonlinear functions based on the key value, and applying each of the plurality of modified nonlinear functions to the plurality of blocks to generate an output hash value for use in authenticating the file. Other embodiments of this aspect include corresponding systems, apparatus, and computer programs, configured to perform the actions of the methods, encoded on computer storage devices.

These and other embodiments can each optionally include one or more of the following features. The plurality of modified nonlinear functions are applied to the plurality of blocks in a plurality of iterations including one or more nonfinal iterations and a final iteration. A buffer value is initialized to an initial hash value, and the buffer value is modified by combining a current buffer value with a result of an iteration of applying one or more modified nonlinear functions to one or more of the blocks to generate an updated buffer value. The updated buffer value for each nonfinal iteration is used as a current buffer value for a subsequent iteration. The updated buffer value for the final iteration is used to generate the output buffer value. Each of a second plurality of predetermined nonlinear functions are modified based on the key value, each of the second plurality of modified nonlinear functions are applied to the plurality of blocks to generate a second updated buffer value, and the updated buffer value for the final iteration is combined with the second updated buffer value to generate the output hash value. Modifying each of a plurality of predetermined nonlinear functions based on the key value includes at least one of determining an amount of rotation to be applied to blocks of data based on the key value or selecting specific data for processing by the plurality of nonlinear functions based on the key value. The file is authenticated for use with specific multimedia content. The file is adapted for execution on a virtual machine player to present multimedia content.

Particular embodiments of the subject matter described in this specification can be implemented so as to realize one or more of the following advantages. The subject matter can be implemented as a non-standard, one way hashing algorithm that is resistant to cryptanalysis and is difficult to reverse engineer. The hashing algorithm can be used for any data. As one example, it can be used to verify the integrity of a Flash® Player SWF file to prevent FLV and bandwidth theft and protect the SWF file in case it is decompiled. Verifying SWF files prevents third parties from creating their own SWF files that attempt to stream another entity's resources. These techniques can also be used to protect a URL that streams video or other content presented using the SWF file. In general, the hashing algorithm can be used to authenticate a client (e.g., a SWF file) to a server (e.g., a Flash® Media Server). The server can base a decision on whether to send resources (video, music, other types of data) to the client based on the authentication, which allows the server to only send valuable resources to trusted clients. The techniques can also be used to verify the integrity of any other type of file or message.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference symbols in the various drawings indicate like elements.

DETAILED DESCRIPTION

A hash algorithm can be used to verify a file. For example, a multimedia player file can be verified to protect against a threat of use of an unauthorized player file (e.g., a SWF file). An unauthorized player file can be used in some systems, for example, to stream or play back multimedia content without the authorization, remuneration, or other benefit to the content provider. Standard hash algorithms can be reverse engineered because an attacker may be able to model a static algorithm that can be used to create a hash value. Using a hash algorithm that modifies operations used in the algorithm based on an input key can reduce the threat of a hash algorithm being reverse engineered.

Figure 1:
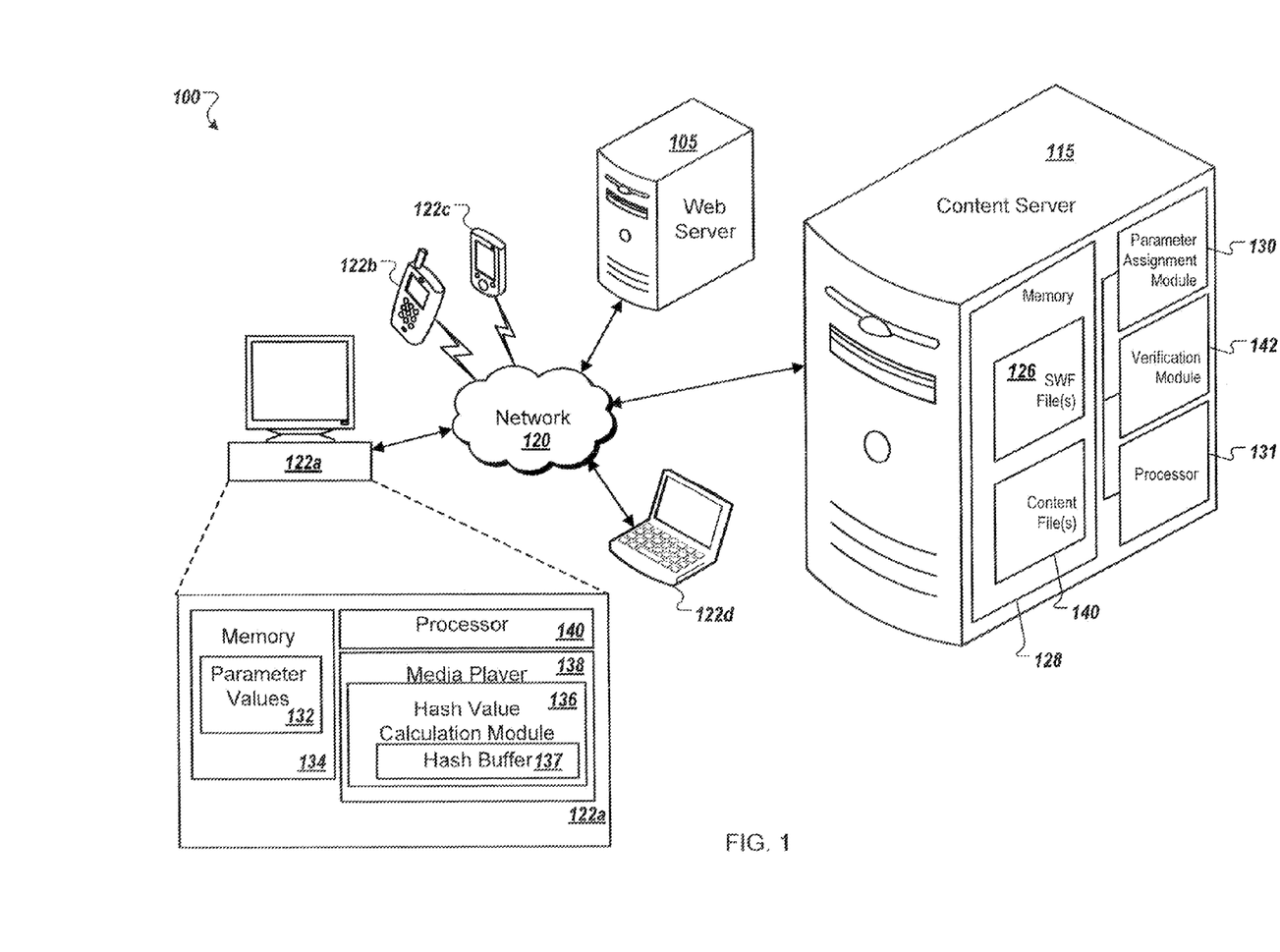
FIG. 1 is a block diagram illustrating a system for verifying an input message.

FIG. 1 is a block diagram illustrating a system 100 for verifying an input message. The system 100 includes one or more web servers 105 and one or more content servers 115. Although only one of each of the servers 105 and 115 is illustrated in FIG. 1 for convenience, the functionality of the servers 105 and 115 can be distributed among multiple different servers. In addition, the functionality of the different servers 105 and 115 can be implemented in one or more server pools. Throughout the following description, functions described as being performed on a server can be performed on a single server or on multiple servers acting in concert to perform the describe functions. The web server 105 and the content server 115 can communicate through a network 120. The network 120 can include the Internet, one or more local area networks (LANs), one or more wireless networks, or any other network capable of facilitating electronic communications.

The web server 105 and content server 115 can be accessed across the network 120 by client devices 122, e.g., personal computers 122a, mobile phones 122b, personal digital assistants (PDAs) 122c, laptop computers 122d or other remote devices capable of communicating across the network 120. For example, a user of the client device 122a may desire to view content (e.g., multimedia content) provided by the web server 105. The user can enter or otherwise select (e.g., by clicking on a hyperlink) a URL (Uniform Resource Locator), corresponding to a resource located on the web server 105, into a web browser running on the client device 122a.

The resource can include a reference to multimedia content (e.g., Flash® content). The web server 105 can provide one or more files used to present the multimedia content (e.g., a player file that provides a runtime environment for presenting video, audio, text, and/or other information, which may be contained in a separate file). For example, in some implementations, the web server 105 can provide a SWF (Small Web Format) file, a Microsoft Silverlight file, or any other type of file. The operator of the web server 105 may desire that multimedia content provided by the web server 105 be viewed using a player file provided by the web server 105 or by the content server 115 and not some other player file. For example, the player file provided by the web server 105 or content server 115 can be configured to present advertisements, gather user behavior analytics, or perform other functionality beneficial to the provider of the web server 105. Moreover, control of the player file used to present multimedia content can prevent third parties from deriving an unauthorized benefit from proprietary or otherwise protected (e.g., copyrighted) content.

In response to the request for the resource by the client device 122a, the web server 105 can send a copy of the resource to the client device 122a and can also send a copy of a player file (e.g., SWF file) to the client device 122a. In some implementations, the resource and/or the player file can be provided by the content server 115. For example, the web server 105 can forward a request for the resource and/or the player file to the content server 115. The content server 115 can retrieve a player file from a player file repository (e.g., SWF files repository 126) included in memory 128 of the content server 115. Along with the resource and the player file, the web server 105 or content server 115 can send a request to the client device 122a requesting that the client device 122a verify the player file. In some implementations, the web server 105 or content server 115 can initially send only the player file and await verification of the player file, as described below, before sending (e.g., streaming) the content. Alternatively, the content may be sent along with the player file but may require a separate key, which is provided by the web server 105 or content server 115 after verification of the player file, to unlock the content.

For example, the web server 105 or content server 115 can require that the client device 122a calculate a hash value or other fingerprint of the player file and send the hash value to the web server 105 or to the content server 115 before authorizing playback of the content. In some implementations, the web server 105 or content server 115 can send a request to calculate a hash value in a particular manner. The request can include an input key value that is used to calculate an output hash value. In some implementations, the request can also include an input hash value that is used as an initial hashing value to be modified by application of the hashing algorithm. For example, a parameter assignment module 130 included in the content server 115 can assign an input key value and an input hash value for inclusion in the request that is sent to the client device 122a. The parameter assignment module 130 can include software instructions stored in the memory 128 (or in another storage area) that are executable by a processor 131 included in the content server 115. These software instructions can, for example, select among various input key values and/or input hash values in a random manner or some other manner, which may appear random to outside observers. In some cases, the request can include the actual input key value and/or input hash value. In other cases, the request can include a pointer or other identifier for the assigned input key value and/or input hash value, the actual values of which can be predefined on the client device 122a.

The client device 122a can store the input key value and the input hash value in (or can select an identified input key value and/or input hash value from) a parameter values area 132 of memory 134 included in the client device 122a. A hash value calculation module 136 included in a media player application (e.g., Flash® player application) 138 calculates an output hash value for the received player file using the input key value and the input hash value. As described below, the output hash value can be generated through iterative modifications to the input hash value. Throughout these iterations, the input, intermediate, and output hash values can be stored in a hash buffer 137 included, for example, within the hash value calculation module 136. The hash value calculation module 136 can include software instructions stored in the memory 134 (or in another storage area) that are executable by a processor 140 included in the client device 122a. The client device 122a can send the calculated output hash value to the content server 115.

The hash calculation module 136 calculates the output hash value using an algorithm that processes the player file using multiple nonlinear functions, where the operations performed by the nonlinear functions are modified based on the key value. Using such an algorithm can make it difficult to reverse engineer the algorithm compared to a standard hash algorithm (e.g., an algorithm that includes logic that does not change based on an input key and/or that uses known processing steps). If a hash algorithm is reverse engineered or otherwise compromised, it may be possible for multimedia content provided by the web server 105 to be used without permission and/or without benefit to the provider of the web server 105. However, because the techniques implemented by the hash calculation module 136 rely on non-standard processing operations that are not easily detected, the techniques are generally not susceptible to reverse engineering.

A verification module 142 included in the content server 115 can verify the output hash value sent by the client device 122a. For example, the verification module 142 can compare the output hash value received from the client device 122a to an expected hash value. The verification module 142 can, for example, look up an expected hash value associated with the sent input key value and input hash value. As another example, the verification module 142 can calculate an expected hash value using the input key value and input hash value using the same hash calculation algorithm used by the hash value calculation module 136 included in the client device 122a.

If the output hash value received from the client device 122a matches the expected hash value, the content server 115 can authenticate the player file. For example, the content server 115 can send the multimedia content referenced from the resource requested by the client device 122a to the client device 122a, enabling the playback of the multimedia content using the player file sent to the client device 122a and using the multimedia player (e.g., Flash® player) 138 included in the client device 122a. The multimedia player 138 can, for example, be a virtual machine configured to execute player files.

As another example, in some implementations, the multimedia content can be sent to the client device 122a along with the player file, the input key value, and the input hash value. If the content server 115 verifies the output hash value received from the client device 122a, the content server 115 can send a message to the client device 122a instructing the multimedia player 138 to allow playback of the multimedia content (e.g., multimedia content may be unplayable in the multimedia player 138 without approval from the content server 115).

Figure 2:
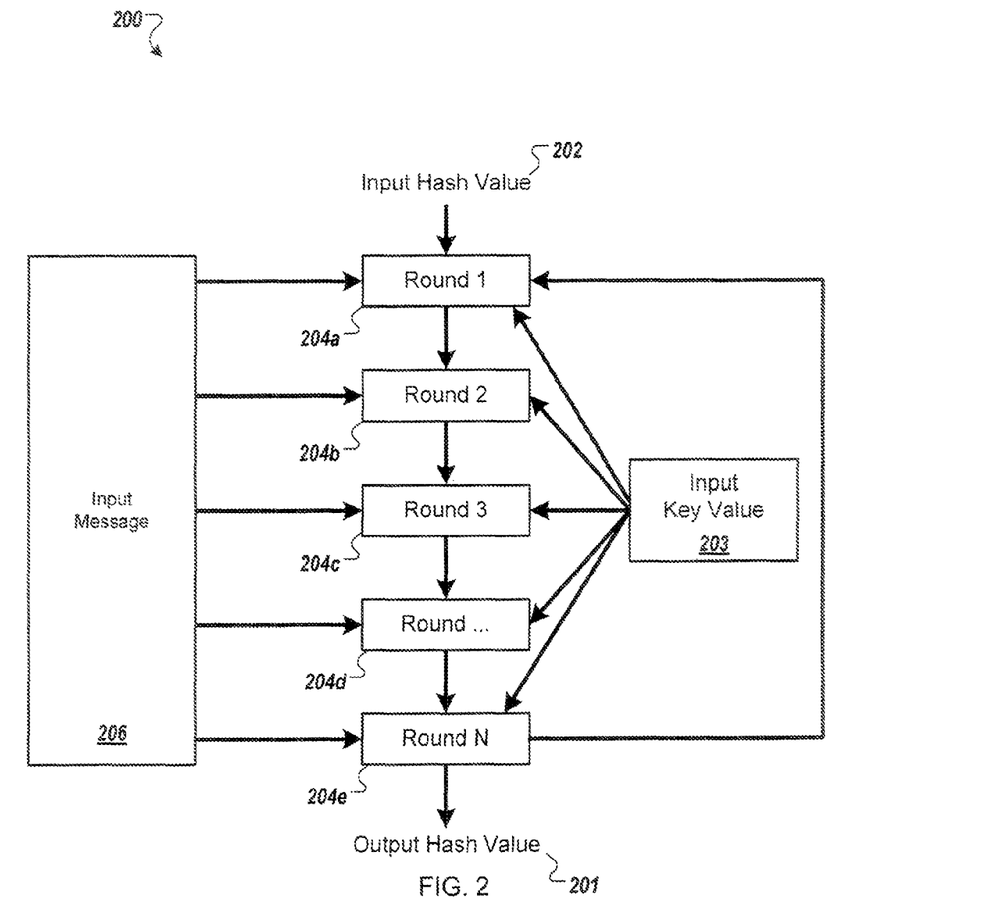
FIG. 2 is a block diagram illustrating an algorithm for calculating an output hash value.

FIG. 2 is a block diagram illustrating an algorithm 200 for calculating an output hash value 201. In the algorithm 200, an input hash value 202 and an input key value 203 are used by a set of processing rounds 204 to process an input message 206 to produce the output hash value 201. The input message 206 can be, for example, a file (e.g., a SWF file) or some other data.

The input message 206 can be processed in segments. For example, the processing rounds 204 can process the input message in segments of a particular size (e.g., 512 bits). The input message 206 can be padded before being processed by the processing rounds 204, such that the size of the input message 206 is evenly divisible by a certain segment size (e.g., 512). If the input message 206 is processed in segments, the algorithm 200 can include a repetition structure (e.g., a loop) which processes one segment of the input message 206 at a time. Within each loop iteration, a current segment can be identified and each of the processing rounds 204 can process the current segment. Alternatively, each loop iteration can operate on only a portion of the segment, such that multiple loops are performed for each segment.

The input hash value 202 can include an initial value that is copied to a hash buffer (e.g., hash buffer 137 in FIG. 1). Each processing round 204 can perform a plurality of nonlinear functions using some or all data from the hash buffer and some or all data from the current segment of the input message 206. The output of a particular processing round 204 can be stored in the hash buffer and the hash buffer can be used as input to a subsequent processing round 204. Nonlinear functions can include, for example, left rotation of data, bitwise Boolean operations (e.g., AND, OR, NOT, XOR (exclusive OR)), two's complement module $2^{32}$ addition, or other operations.

The operations performed by the plurality of nonlinear functions can be modified based on the input key value 203. For example, the number and type of operations performed by a processing round 204, the words selected for processing from the segment of the input message 206, and the words selected for processing from the hash buffer can be determined based on the input key value 203. For example, the amount of left rotation performed by some or all processing rounds 204 can vary based on the input key value 203. As a more particular example, if the input key value is, for example, "5", then the processing round 204a can perform, for example, a left rotation operation using a rotation amount of two bits, and if the input key value is, for example, "7", then processing round 204a can perform, for example, a left rotation operation using a rotation amount of three bits.

As another example, if the input key value is, for example, "A", then a particular processing round 204 can perform, for example, AND, NOT, and XOR Boolean operations but not OR Boolean operations on the current segment of the input message 206 and on the hash buffer and if the input key value is, for example, "H", then a particular processing round 204 can perform OR and NOT Boolean operations but not AND nor XOR operations on the current segment of the input message 206 and on the hash buffer.

Each processing round 204 can perform one or more nonlinear functions, or a variable number of nonlinear functions, where the number of nonlinear functions may vary based on the input key value 203. For example, in some implementations, each processing round 204 performs sixteen nonlinear functions. In some implementations, some or all of the nonlinear functions use the input key value as part of one or more operations. In addition to modifying the nonlinear functions based on the input key, the input key can also be selectively combined with the input message as in standard key-based hashing algorithms to alter the values that are input into the nonlinear functions.

The algorithm 200 can include a particular number of processing rounds 204 (e.g., two, three, five, ten, or any other number of processing rounds). In some implementations, the input message 206 (or a copy of the input message 206) is processed in parallel by multiple (e.g., two) sets of processing rounds 204. In such implementations, each set of processing rounds 204 can produce an output hash value 201, and a final output hash value 201 may be generated by combining (e.g., adding together) the output hash values 201 generated by each set of the multiple sets of processing rounds 204.

Figure 3:
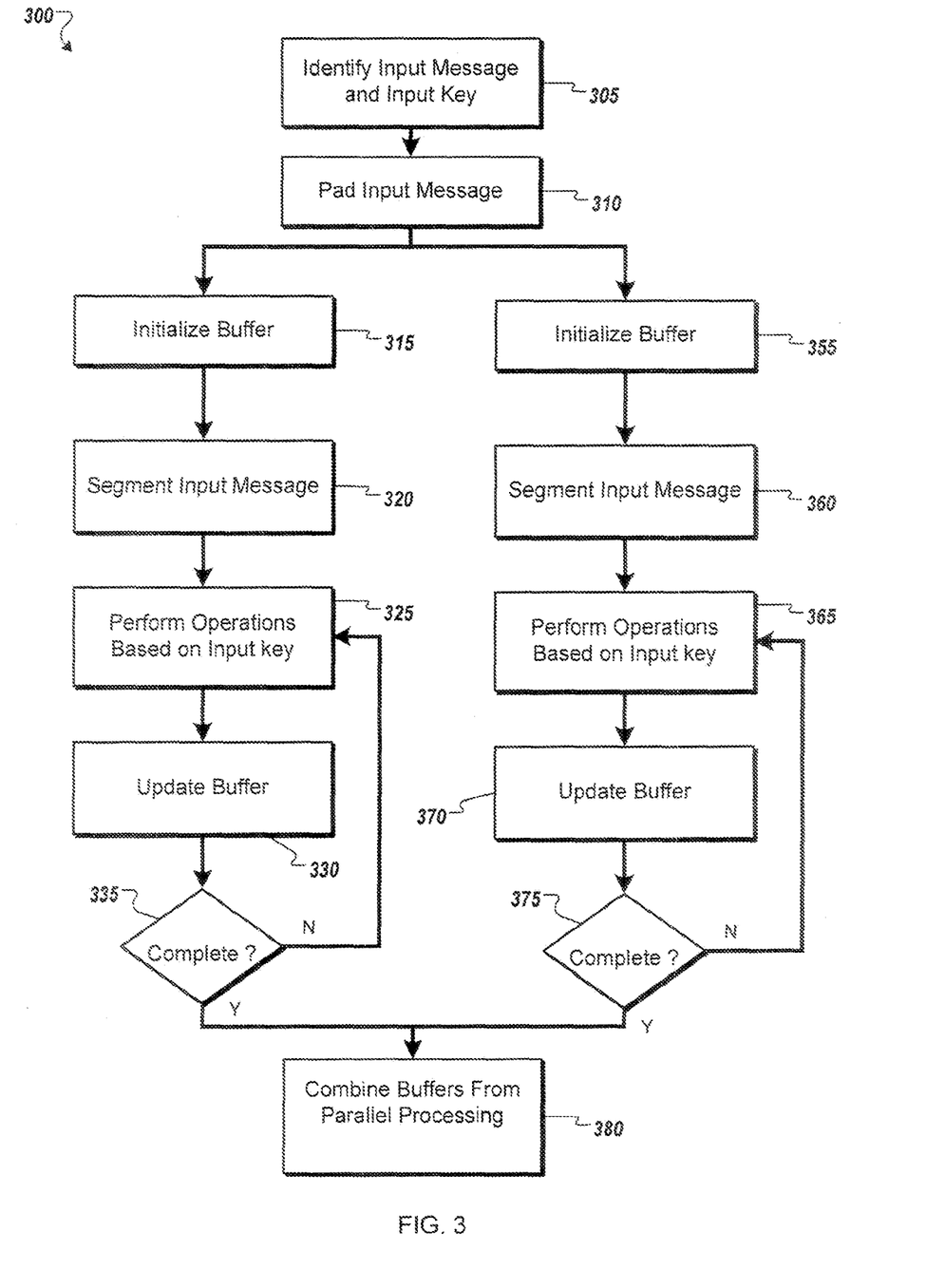
FIG. 3 is a flowchart illustrating a process for generating a hash value.

FIG. 3 is a flowchart illustrating a process 300 for generating a hash value. The process 300 can be performed, for example, by a server and/or by a client device. An input message and input key are identified at 305. For example, a file to be verified can be identified. As a more particular example, a SWF file used to present multimedia content can be identified. A client device, for example, can receive a SWF file to be verified from a server. In addition to identifying an input message, an input key value can be identified. For example, a client device can receive an input key value or an identification of an input key from a server. As another example, a server can select or generate an input key value to send to a client device and can store the input key sent to the client device for use in calculating an expected hash value in parallel with the client device's calculation of a hash value based on the input message and input key.

The input message is padded at 310. For example, the input message can be padded so that the length of the input message including the padding is evenly divisible by a certain size (e.g., 512 bits). As a more particular example, a first padding operation can be performed which results in the input message having a length of sixty four bits less than a multiple of 512 bits, and a second padding operation can be performed which adds a sixty four (64) bit length value to the padded input message, resulting in the input message including padding from both padding operations having a length evenly divisible by 512 bits.

In some implementations, the input message is processed using multiple (e.g., two) parallel processing paths, each of which operates on the same input data but which typically use entirely different or at least different combinations of nonlinear operations. In the example of FIG. 3, the first parallel path begins at 315 and a second parallel path begins at 355, where the path beginning at 355 includes similar processing to the path beginning at 315. In some alternative implementations, only one path is used, while other alternative implementations can use more than two parallel paths. At 315 (and similarly at 355), a buffer is initialized. For example, a buffer can be initialized to a pre-determined input hash value or set of values. As another example, the buffer can be initialized to a received value or set of values (e.g., a value or set of values received from a server). As a more particular example, the buffer can be a 160-bit buffer including five 32-bit words initialized to a series of hexadecimal values (where each value is a 32-bit word value), e.g.: 67452301, efcdab89, 98badcfe, 10325476, and c3d2e1f0. Other initial buffer values can also be used. At 355, a different, second buffer can be initialized. The second buffer can be initialized to the same value described above with respect to 315, or to a different value.

The input message is segmented at 320 (and similarly at 360). For example, the input message can be segmented into blocks of a particular size (e.g., 512 bits). The input message can be segmented into a block size based on the padding logic used in 310 above. For example, if the padding logic used in 310 above pads the input message to a size evenly divisible by a certain size (e.g., 512 bits), then the input message can be segmented into blocks of that size (e.g., 512 bits). A repetition structure can be configured to process segments of the input message. In some implementations, one repetition structure can include all parallel processing paths (e.g., the path beginning at 315, the path beginning at 355). In some implementations, each parallel processing path can be included in a different repetition structure.

The input message, or more specifically, a current segment of the input message, is processed using a plurality of non-linear functions at 325 (and similarly at 365), where the operations performed by the plurality of non-linear functions are modified based on the input key value. In some implementations, the buffer is also processed. For example, the number and type of operations performed and the words selected for processing from the segment of the input message and the words selected for processing from the buffer can be determined based on the input key value. For example, the amount of left rotation performed and particular Boolean operations selected to be performed can vary based on the input key value. Other types of operations can be performed, such as two's complement $2^{32}$ modulo addition of words. Generally, multiple different non-linear functions are used at 325 and a different set of non-linear functions is used at 365, although it is possible for some non-linear functions to be used more than once, either in the same parallel processing path or in different parallel processing paths.

In some implementations, operations are performed by a set of processing rounds, where the number of processing rounds can be predetermined (e.g., five) or variable (e.g., based on the input key value). Each processing round can perform a predetermined number (e.g., sixteen) or a variable number (e.g., based on the input key value) of operations.

The buffer is updated at 330 (and similarly at 370). For example, if the current buffer value is used as an input to the processing round, the output of a processing round can be stored in the buffer. As a more particular example, the output of each processing round statement can be stored in a particular word of the buffer. Alternatively, the output of a processing round can be combined with (e.g., added to) the current buffer value to produce a new buffer value that is used by a subsequent processing round and/or a subsequent iteration of the processing rounds to iteratively modify the buffer value.

At 335 (and similarly at 375), it is determined whether processing of the input message is complete. For example, it can be determined whether there are more segments to process. If there are more segments to process, operations are performed on the segment based on the input key value (at 325). If there are no more segments to process, buffers from parallel processing are combined at 380. For example, the buffer associated with each parallel processing path can be added together or otherwise combined to generate a final output hash value.

Figure 4:
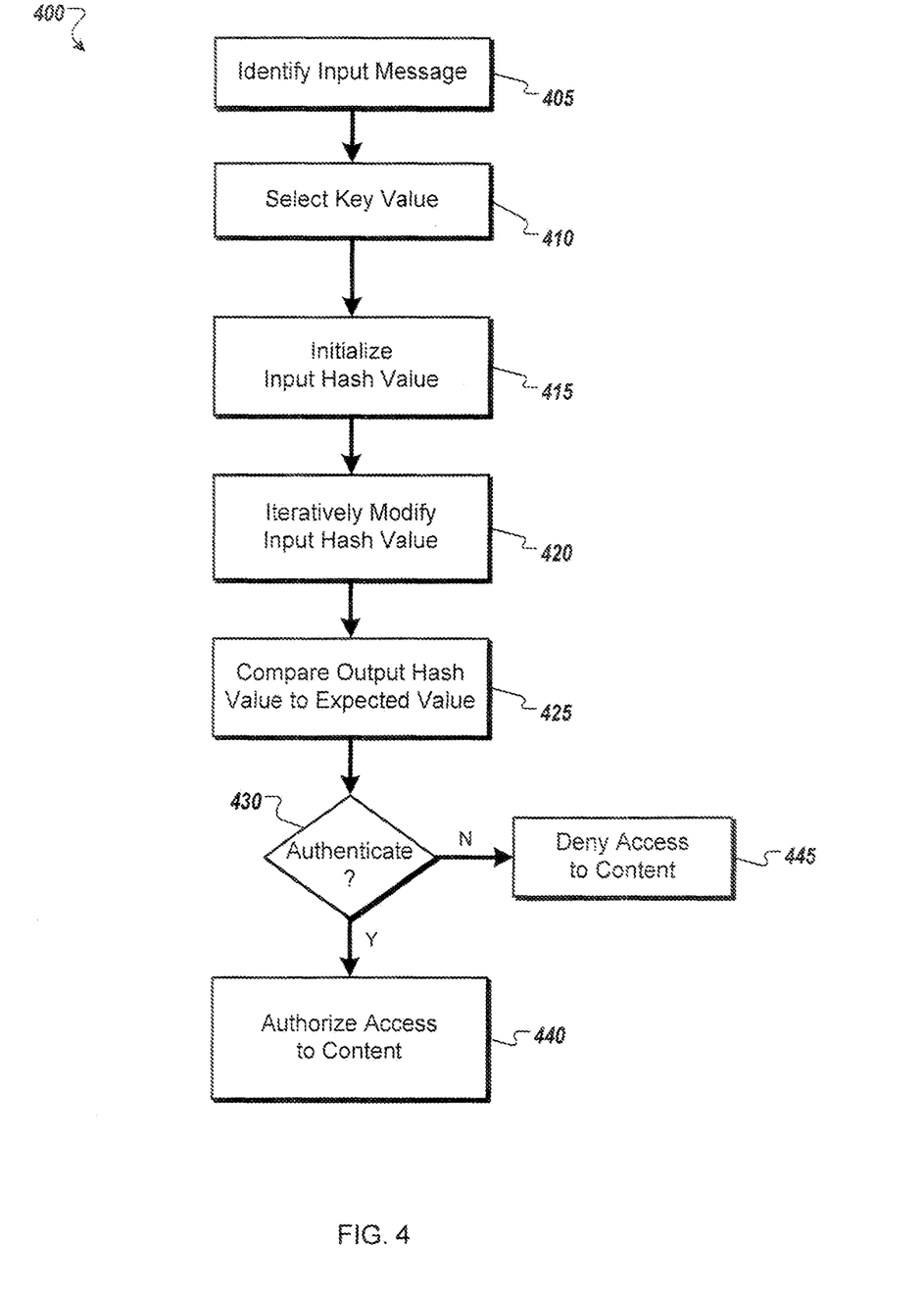
FIG. 4 is a flowchart illustrating a process for authorizing access to content.

FIG. 4 is a flowchart illustrating a process 400 for authorizing access to content. An input message is identified at 405. For example, a file to be verified can be identified. As a more particular example, a SWF file sent to a client device used to present multimedia content on the client device can be identified.

A key value is selected at 410. For example, a key value can be generated randomly, can be based on the current date and time, can be based on the input message, or can be based on a file (e.g., a multimedia content file) or on other data associated with the input message.

An input hash value is initialized at 415. For example, an input hash value can be initialized to a pre-determined value or set of values. As another example, the input hash value can be initialized to a 160-bit value including five 32-bit words initialized to the following hexadecimal values (where each value is a 32-bit word value): 67452301, efcdab89, 98badcfe, 10325476, and c3d2e1f0.

The input hash value is iteratively modified at 420. For example, at least a subset of a plurality of nonlinear functions can be iteratively applied to each of a plurality of blocks of the input message and to the input hash value. The operations performed by the plurality of nonlinear functions can include, for example, some or all of rotating data, calculating a complement of data, or performing Boolean operations. As another example, the input hash value can be modified by iteratively applying a plurality of subsets of nonlinear functions to data from the input message and to the input hash value in parallel to generate a plurality of parallel hash values. The plurality of parallel hash values can be combined to generate an output hash value. The nonlinear functions can be modified based on the input key value, for example, by determining an amount of rotation to be applied based on the input key value and/or by selecting specific data for processing by the plurality of nonlinear functions based on the input key value.

A buffer can be initialized to the input hash value and the plurality of modified nonlinear functions can be applied to the plurality of blocks and to the buffer in a plurality of iterations including one or more nonfinal iterations and a final iteration. The buffer can be modified by combining a current buffer value with a result of an iteration of applying one or more modified nonlinear functions to one or more of the blocks to generate an updated buffer value. The updated buffer value for each nonfinal iteration can be used as a current buffer value for a subsequent iteration. The updated buffer value for the final iteration can be used to generate an output hash value.

The output hash value is compared to an expected value at 425. For example, the generated output hash value can be compared to a second output hash value received from a client device.

A determination of whether to authenticate the input message is made at 430. For example, if the output hash value is equal to the expected value, access to content associated with the input message is authorized at 440. For example, if the input message is a SWF file used to present multimedia content, access to requested multimedia content can be authorized based on a match between the output hash value and the expected hash value. More particularly, as one example, requested multimedia content can be sent to a client device. As another example, a message can be sent to a client device authorizing playback of multimedia content previously sent to the client device.

If the output hash value is not equal to the expected value, access to content is denied at 445. For example, a request for multimedia content from a client device can be ignored. As another example, an error message can be sent to the client device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous. In other alternative embodiments, the described techniques can be used to generate numerical values, and those numerical values can be used to perform authentication (e.g., authenticating someone by their ability to perform an action) or the resultant numerical values can be used as the input to another function (e.g., as a key for XORing data together).

What is claimed is:

1. A method performed by data processing apparatus, the method comprising:
   identifying a file;
   identifying a key value;
   processing the file using a plurality of nonlinear functions to generate an output hash value with operations performed by the plurality of nonlinear functions, the processing of the file including modifying each of the plurality of nonlinear functions by at least one of determining an amount of rotation to be applied to data from the file based on the key value or selecting data for processing by the plurality of nonlinear functions based on the key value;
   using the output hash value as an input for additional processing of the file using the plurality of nonlinear functions to generate an additional output hash value for use in verifying the file; and
   verifying the file based on a comparison of the additional output hash value to an expected output hash value.

2. The method of claim 1, wherein processing the file using the plurality of nonlinear functions includes:
   identifying an input hash value; and
   modifying the input hash value by iteratively applying at least a subset of the plurality of nonlinear functions to data from the file.

3. The method of claim 2, wherein processing the file using the plurality of nonlinear functions further includes:
  segmenting the file into a plurality of blocks; and
  modifying the input hash value by iteratively applying at least a subset of the plurality of nonlinear functions to each of the plurality of blocks.

4. The method of claim 3, wherein processing the file using the plurality of nonlinear functions further includes:
  modifying the input hash value by iteratively applying a plurality of subsets of nonlinear functions to data from the file in parallel to generate a plurality of parallel hash values; and
  combining the parallel hash values to generate the output hash value.

5. The method of claim 3, wherein the operations performed by the plurality of nonlinear functions include rotating data in the blocks and at least one of calculating a complement of data in the blocks or performing Boolean operations on data in the blocks.

6. The method of claim 1, wherein the output hash value is generated by at least processing the key value using one or more of the plurality of nonlinear functions.

7. The method of claim 1, wherein the file comprises a file used to present multimedia content on a client device.

8. The method of claim 7, wherein the file comprises a SWF file.

9. The method of claim 7, further comprising:
  receiving the file from a server;
  receiving one of the key value or an identification of the key value from the server;
  presenting the multimedia content using the file in response to verifying the file.

10. The method of claim 9 wherein verifying the file includes sending the output hash value to the server for verification.

11. The method of claim 9, wherein verifying the file includes comparing the output hash value to an output hash value associated with one of the file or the multimedia content.

12. A computer storage medium comprising instructions that, responsive to execution by a computing device, cause the computing device to perform a method, the method comprising:
  receiving a file to be verified;
  identifying a key value for use in verifying the file;
  segmenting the file into a plurality of blocks;
  modifying each of a plurality of predetermined nonlinear functions based on the key value, each of the plurality of predetermined nonlinear functions being modified by at least one of determining an amount of rotation to be applied to data in the plurality of blocks based on the key value or selecting specific data for processing by the plurality of nonlinear functions based on the key value;
  applying each of the plurality of modified nonlinear functions to the plurality of blocks in iterations that include one or more nonfinal iterations and a final iteration, said applying including:
    initializing a current buffer value to a first output hash value;
    modifying the current buffer value by at least combining the current buffer value with a result of an iteration of applying one or more of the modified nonlinear functions to one or more of the plurality of blocks to generate an updated buffer value, the updated buffer value for each nonfinal iteration being usable as the current buffer value for a subsequent iteration; and
    using the updated buffer value as an input for the final iteration of said applying the plurality of modified nonlinear functions to the plurality of blocks to generate a second output hash value for use in authenticating the file.

13. The computer storage medium of claim 12, wherein the instructions, responsive to execution by the computing device, cause the computing device to perform a method further comprising:
  modifying each of a second plurality of predetermined nonlinear functions based on the key value;
  applying each of the second plurality of modified nonlinear functions to the plurality of blocks to generate a second updated buffer value; and
  combining the updated buffer value for the final iteration with the second updated buffer value to generate the output hash value.

14. The computer storage medium of claim 12, wherein the instructions, responsive to execution by a computing device, cause the computing device to perform a method further comprising authenticating the file for use with specific multimedia content.

15. A system comprising:
  one or more processors configured to implement a verification module as executable instructions, the verification module configured to:
    identify a key value to generate an output hash value;
    authenticate a file stored on a user device based on a comparison of the output hash value with an expected output hash value that is associated with an authorized version of the file; and
    generate the expected output hash value based on:
      a plurality of predetermined nonlinear functions each modified based on at least one of:
        a determination of an amount of rotation to be applied to segments of data from the file based on the identified key value; or
        selection of specific data from the file for processing by the plurality of nonlinear functions based on the identified key value;
      each of the plurality of modified nonlinear functions applied to segments of the file in iterations that include one or more nonfinal iterations and a final iteration;
      a current buffer value initialized to a first output hash value;
      an updated buffer value generated from a combination of the current buffer value with a result of a nonfinal iteration of one or more of the modified nonlinear functions applied to one or more of the segments of the file, the updated buffer value for each nonfinal iteration being usable as the current buffer value for a subsequent iteration; and
      the updated buffer value used as an input for the final iteration of the plurality of predetermined nonlinear functions applied to the segments of the file to generate the expected output hash value.

16. The system of claim 15, wherein the file is adapted for execution on a virtual machine player to present multimedia content.

17. The system of claim 15, wherein the one or more processors are executed by a server that is operable to interact with the user device through a data communication network, and the user device is operable to interact with the server as a client.

18. The system of claim 15, wherein the expected output hash value is generated further based on a repetition structure that processes the segments of the file sequentially.

19. The system of claim 15, wherein each segment of the file is processed using a repetition loop having multiple loop iterations that operate on one or more portions of the segment.

20. The system of claim 15, wherein:
- the current buffer value is stored in a hash buffer; and
- one or more of the iterations utilizes a portion of data from the hash buffer and a portion of data from a current segment of the file, rather than all the data from the hash buffer and all the data from the current segment of the file.

* * * * *

UNITED STATES PATENT AND TRADEMARK OFFICE
CERTIFICATE OF CORRECTION

| | | |
|---|---|---|
| PATENT NO. | : 9,075,798 B2 | Page 1 of 1 |
| APPLICATION NO. | : 12/847649 | |
| DATED | : July 7, 2015 | |
| INVENTOR(S) | : Roderick David Schultz | |

It is certified that error appears in the above-identified patent and that said Letters Patent is hereby corrected as shown below:

In the claims
Column 15, line 4, delete "15", insert -- 18 --, therefor.

Signed and Sealed this
First Day of December, 2015

Michelle K. Lee
*Director of the United States Patent and Trademark Office*